(12) United States Patent
Haidet et al.

(10) Patent No.: US 11,052,706 B2
(45) Date of Patent: Jul. 6, 2021

(54) COMPOSITE LAYER TIRE

(71) Applicant: Bridgestone Americas Tire Operations, LLC, Nashville, TN (US)

(72) Inventors: Andrew V. Haidet, Silver Lake, OH (US); Douglas B. Costlow, Akron, OH (US)

(73) Assignee: BRIDGESTONE AMERICAS TIRE OPERATIONS, LLC, Nashville, TN (US)

( * ) Notice: Subject to any disclaimer, the term of this patent is extended or adjusted under 35 U.S.C. 154(b) by 287 days.

(21) Appl. No.: 16/061,141

(22) PCT Filed: Dec. 20, 2016

(86) PCT No.: PCT/US2016/067671
§ 371 (c)(1),
(2) Date: Jun. 11, 2018

(87) PCT Pub. No.: WO2017/116825
PCT Pub. Date: Jul. 6, 2017

(65) Prior Publication Data
US 2018/0354304 A1 Dec. 13, 2018

Related U.S. Application Data

(60) Provisional application No. 62/272,147, filed on Dec. 29, 2015.

(51) Int. Cl.
| | |
|---|---|
| *B60C 7/10* | (2006.01) |
| *B60C 7/14* | (2006.01) |
| *B60C 5/18* | (2006.01) |

(52) U.S. Cl.
CPC .............. *B60C 7/10* (2013.01); *B60C 5/18* (2013.01); *B60C 7/102* (2013.01); *B60C 7/14* (2013.01);
(Continued)

(58) Field of Classification Search
CPC .... B60C 7/00; B60C 7/08; B60C 7/10; B60C 7/102; B60C 7/105; B60C 7/14;
(Continued)

(56) References Cited

U.S. PATENT DOCUMENTS

| | | |
|---|---|---|
| 1,447,784 A | 3/1923 | Hulse |
| 2,264,767 A | 12/1941 | Ofensend |

(Continued)

FOREIGN PATENT DOCUMENTS

| | | |
|---|---|---|
| CN | 106163832 | 11/2016 |
| DE | 102012211450 | 1/2014 |

(Continued)

OTHER PUBLICATIONS

Search Report and Written Opinion; Corresponding PCT application Serial No. PCT/US2016/067671; dated Feb. 28, 2017; Authorized Officer Lee, Myung Jin.

(Continued)

*Primary Examiner* — Robert C Dye
*Assistant Examiner* — Sedef E Paquette
(74) *Attorney, Agent, or Firm* — Shaun J. Fox; Bryan J. Jaketic

(57) ABSTRACT

A green tire includes a plurality of sheets of green rubber having a substantially circular shape, wherein each sheet of green rubber includes an upper ring and a lower ring, and each sheet of green rubber further includes a plurality of spoke portions extending from the upper ring to the lower ring. The green tire further includes a plurality of reinforcements. Each reinforcement is disposed between adjacent sheets of green rubber. At least one reinforcement is sandwiched between the upper rings of adjacent sheets of green rubber, and at least one reinforcement is sandwiched between the spoke portions of adjacent sheets of green rubber.

8 Claims, 13 Drawing Sheets

(52) U.S. Cl.
CPC .. *B60C 2007/107* (2013.01); *B60C 2007/146* (2013.01)

(58) Field of Classification Search
CPC ........ B60C 2007/107; B60C 2007/146; B60C 7/02; B60C 2007/005; B60C 5/18; B29D 30/02
USPC ................................ 156/112, 404; 152/151
See application file for complete search history.

(56) References Cited

U.S. PATENT DOCUMENTS

| | | | |
|---|---|---|---|
| 4,934,429 | A | 6/1990 | Koseki et al. |
| 5,676,900 | A | 10/1997 | Pajtas |
| 7,032,634 | B2 | 4/2006 | Laurent et al. |
| 7,143,797 | B2 | 12/2006 | Vannan |
| 8,104,524 | B2 | 1/2012 | Manesh et al. |
| 8,491,981 | B2 | 7/2013 | Delfino et al. |
| 8,851,131 | B2 | 10/2014 | Luchini et al. |
| 8,883,283 | B2 | 11/2014 | Delfino et al. |
| 8,962,120 | B2 | 2/2015 | Delfino et al. |
| 2008/0053586 | A1 | 3/2008 | Hanada et al. |
| 2009/0107596 | A1 | 4/2009 | Palinkas |
| 2010/0108211 | A1 | 5/2010 | Fenkanyn |
| 2010/0200131 | A1 | 8/2010 | Masanori et al. |
| 2011/0024008 | A1 | 2/2011 | Manesh et al. |
| 2011/0214789 | A1 | 9/2011 | Cress et al. |
| 2012/0060991 | A1 | 3/2012 | Mun et al. |
| 2013/0319591 | A1 | 12/2013 | Van De Wiele |
| 2014/0000777 | A1 | 1/2014 | Choi et al. |
| 2014/0083581 | A1 | 3/2014 | Schaedler et al. |
| 2014/0238561 | A1 | 8/2014 | Choi et al. |
| 2014/0353862 | A1 | 12/2014 | Erdman |
| 2015/0034225 | A1 | 2/2015 | Martin |
| 2015/0053324 | A1 | 2/2015 | Lee et al. |
| 2015/0122382 | A1 | 5/2015 | Choi et al. |
| 2015/0174954 | A1 | 6/2015 | Asper |
| 2015/0251498 | A1 | 9/2015 | Thompson |
| 2018/0345610 | A1* | 12/2018 | Delfino ..................... B60B 9/04 |

FOREIGN PATENT DOCUMENTS

| | | |
|---|---|---|
| EP | 1381527 | 1/2004 |
| EP | 1754615 | 6/2006 |
| JP | H05147044 | 6/1993 |
| KR | 20150129140 | 11/2015 |
| WO | 3425297 | 11/1994 |
| WO | 02083435 | 10/2002 |
| WO | 2014183890 | 11/2014 |

OTHER PUBLICATIONS

Tolentino, Melissa; Bridgestone's non-pneumatic tires; URL: http://siliconangle.com/blog/2013/11/20/3d-printed-car-to-traverse-us-roads-in-2-years/; Nov. 20, 2013.

3D Printing a Rubber Tire with Flex EcoPLA at MakerGeeks.com; MakerGeeks, URL: https://www.youtube.com/watch?v=E5x8BMdATBc; Jun. 22, 2013.

* cited by examiner

COMPOSITE LAYER TIRE

FIELD OF INVENTION

The present disclosure is directed to tires having multiple layers and a method of making the same. More particularly, the present disclosure is directed to tires having multiple layers with reinforcements disposed between adjacent layers, and a method of making the same.

BACKGROUND

Known pneumatic tires are constructed of one or more body plies turned up around a pair of bead portions. A circumferential belt and an optional cap ply are disposed above a crown region of the body plies. Tread rubber and sidewall rubber are disposed about the body plies to form a green tire. Additional inserts and reinforcements may be included at various locations to enhance tire performance under certain conditions. After the green tire is assembled it is cured in a vulcanization mold.

Non-pneumatic tire constructions enable a tire to run in an uninflated condition. Some non-pneumatic tires employ a unitary tire and wheel construction. Other non-pneumatic tires are fastened to wheels using fasteners such as bolts. Non-pneumatic tires may include spokes that buckle or deflect upon contact with the ground. Such spokes may be constructed of a material that is relatively stronger in tension than in compression, so that when the lower spokes buckle, the load can be distributed through the remaining portion of the wheel.

SUMMARY OF THE INVENTION

In one embodiment, a method of making tire includes forming a first sheet of polymeric material having a substantially circular shape. The first sheet of polymeric material includes a first upper ring and a first lower ring, and further includes a first plurality of spoke portions extending from the first upper ring to the second lower ring. The method also includes placing a reinforcement on the first sheet of polymeric material, including placing the reinforcement on at least a portion of the upper ring. The method further includes placing the second sheet of polymeric material having a substantially circular shape on the first sheet of polymeric material such that the reinforcement is sandwiched between the first sheet of polymeric material and the second sheet of polymeric material. The method also includes placing additional sheets of polymeric material having substantially circular shapes and placing additional reinforcements on the second sheet of polymeric material, until a tire is built having a predetermined width.

In another embodiment a green tire includes a plurality of sheets of green rubber having a substantially circular shape, wherein each sheet of green rubber includes an upper ring and a lower ring, and each sheet of green rubber further includes a plurality of spoke portions extending from the upper ring to the lower ring. The green tire further includes a plurality of reinforcements. Each reinforcement is disposed between adjacent sheets of green rubber. At least one reinforcement is sandwiched between the upper rings of adjacent sheets of green rubber, and at least one reinforcement is sandwiched between the spoke portions of adjacent sheets of green rubber.

In yet another embodiment, a method of making a tire includes forming a first substantially circular sheet of green rubber and placing a reinforcement on the first substantially circular sheet of green rubber. The reinforcement is constructed of a material selected from the group consisting of steel, polyester, nylon, carbon fiber, aramid, fiber glass, cotton, hemp, polyurethane and other plastic, other synthetic or natural fibers, and other metal materials. The method further includes placing a second substantially circular sheet of green rubber on the first substantially circular sheet of green rubber such that the reinforcement is sandwiched between the first substantially circular sheet of green rubber and the second substantially circular sheet of green rubber. The method also includes placing additional substantially circular sheets of green rubber and placing additional reinforcements on the second substantially circular sheet of green rubber, until a green tire is built. The method further includes curing the green tire to make a final tire.

In still another embodiment, a green tire includes a plurality of sheets of green rubber having a substantially circular shape, wherein each sheet of green rubber includes an upper ring and a lower ring. Each sheet of green rubber further includes a plurality of spoke portions extending from the upper ring to the lower ring. The green tire also includes a plurality of reinforcements, with each reinforcement disposed between adjacent sheets of green rubber. At least one reinforcement is sandwiched between the upper rings of adjacent sheets of green rubber, and at least one reinforcement is sandwiched between the lower rings of adjacent sheets of green rubber.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
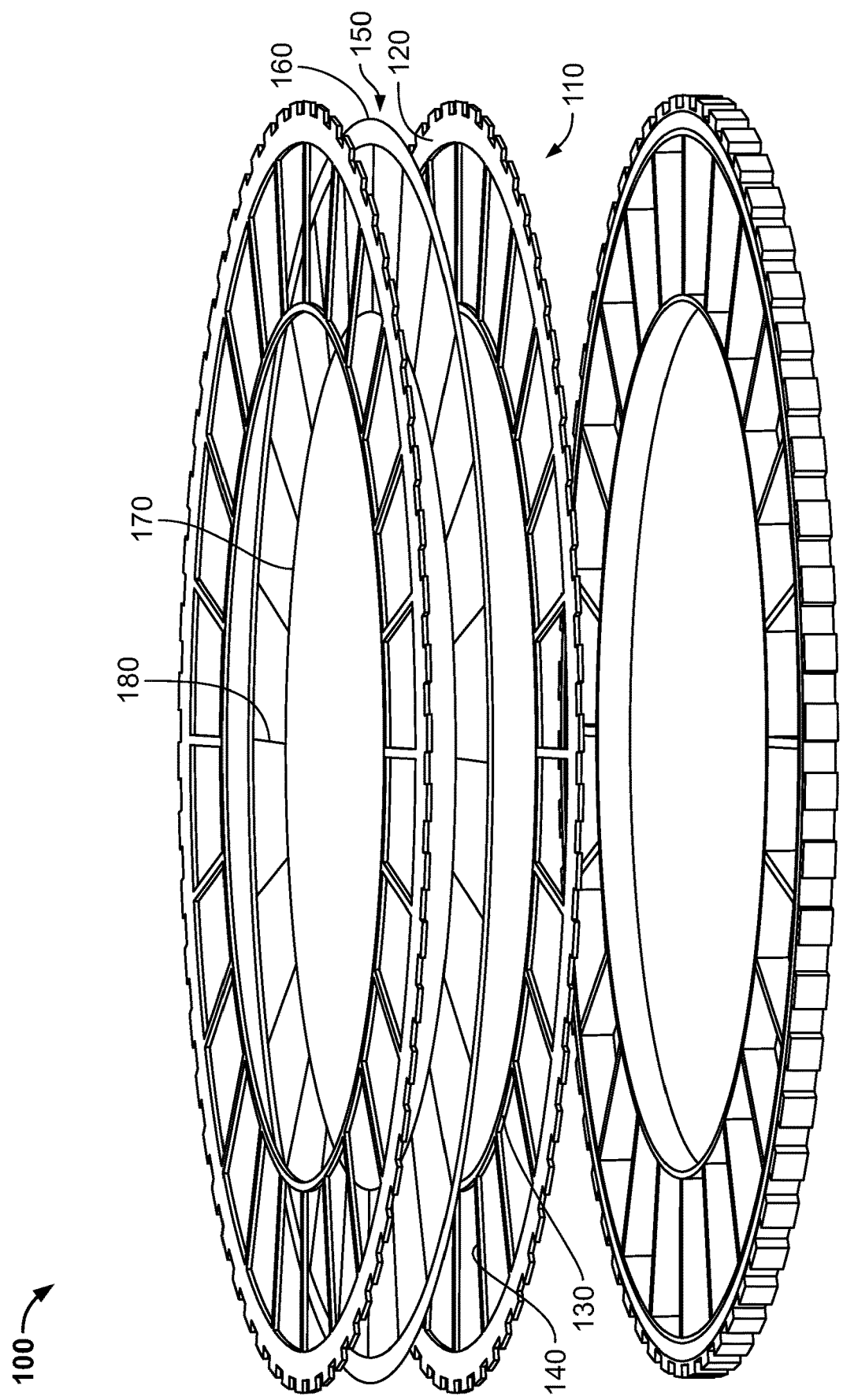
FIG. 1 illustrates an exploded view of one embodiment of a partially assembled non-pneumatic tire.

The following includes definitions of selected terms employed herein. The definitions include various examples and/or forms of components that fall within the scope of a term and that may be used for implementation. The examples are not intended to be limiting. Both singular and plural forms of terms may be within the definitions.

"3D printer" refers to a machine used for 3D printing.

"3D printing" refers to the fabrication of objects through the deposition of a material using a print head, nozzle, or another printer technology.

"Additive manufacturing" refers to a process of joining materials to make objects from 3D model data, usually layer upon layer, as opposed to subtractive manufacturing methodologies. Additive manufacturing includes 3D printing, binder jetting, directed energy deposition, fused deposition modeling, laser sintering, material jetting, material extrusion, powder bed fusion, rapid prototyping, rapid tooling, sheet lamination, and vat photopolymerization.

"Additive systems" refer to machines used for additive manufacturing.

"Axial" and "axially" refer to a direction that is parallel to the axis of rotation of a tire.

"Bead" refers to the part of the tire that contacts a wheel and defines a boundary of the sidewall.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" refers to that portion of the tire between the tread and the bead.

"Spoke" refers to one or more bars, rods, webbing, mesh, or other connecting member extending from a lower member to an upper member. A spoke may include a solid sheet of material.

"Subtractive manufacturing" refers to making objects by removing of material (for example, buffing, milling, drilling, grinding, carving, cutting, etc.) from a bulk solid to leave a desired shape, as opposed to additive manufacturing.

"Tread" as used herein, refers to that portion of the tire that comes into contact with the road or ground under normal inflation and normal load.

"Tread width" refers to the width of the ground contact area of a tread which contacts with road surface during the rotation of the tire under normal inflation and normal load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

While similar terms used in the following descriptions describe common tire components, it should be understood that because the terms carry slightly different connotations, one of ordinary skill in the art would not consider any one of the following terms to be purely interchangeable with another term used to describe a common tire component.

FIG. 1 illustrates an exploded view of one embodiment of a partially assembled non-pneumatic tire 100. The non-pneumatic tire 100 includes a plurality of sheets of polymeric material 110 having a substantially circular shape. In this particular embodiment, each sheet of polymeric material includes an upper ring 120, a lower ring 130, and a plurality of spoke portions 140 extending from the upper ring 120 to the lower ring 130. In an alternative embodiment (not shown), not every sheet of polymeric material includes an upper ring, a lower ring, and a plurality of spoke portions. In one such example, some sheets include an upper ring, a lower ring, and a plurality of spoke portions, while other sheets omit the spoke portion or the lower ring. In another example, some sheets omit the upper ring.

In the illustrated embodiment, the upper ring 120 of each sheet includes a tread portion. The tread portion is shaped to form a tread design. In the illustrated embodiment, the tread portion forms a tread design having a plurality of rectangular tread blocks separated by a plurality of lateral grooves. In alternative embodiments (not shown), the tread portion may form a tread design having ribs, circumferential grooves, sipes, or tread blocks of various shapes and sizes. The tread may be symmetric or asymmetric.

In the illustrated embodiment, each sheet of polymeric material includes 24 spoke portions. In alternative embodiments, each sheet of polymeric material may have any number of spoke portions. In some examples, each sheet of polymeric material has 10-40 spoke portions.

In the illustrated embodiment, each sheet of polymeric material 110 has the same number of spoke portions 140. Additionally, each spoke portion 140 in each sheet 110 has substantially the same shape and size. Further, the spoke portions 140 of adjacent sheets 110 are aligned with each other. However, it should be understood that in alternative embodiments, some sheets may have a different number of spoke portions. Additionally, in other alternative embodiments, the sizes and shapes of the spoke portions on a given sheet may vary. Likewise, in still other alternative embodiments, the spoke portions on a given sheet may have different sizes and shape with respect to the spoke portions on another sheet. Moreover, the spoke portions of different sheets may not be aligned with each other.

In one embodiment, each sheet of polymeric material is constructed of green rubber. In an alternative embodiment, each sheet of polymeric material is constructed of cured rubber. In alternative embodiments, the sheet of polymeric material may be constructed of a foamed polymer, polyurethane, thermoplastics, resins, or other elastomeric or polymeric material. In another alternative embodiment, the sheet is formed of metal instead of a polymeric material. In one embodiment, each sheet is made of a uniform material. In an alternative embodiment, each sheet is constructed of a plurality of different materials. For example, the tread portion, upper ring, lower ring, and spokes may be constructed of different materials. Additionally, different sheets may be constructed of different materials. In any of the above embodiments, adhesive may be employed between sheets of material.

In one embodiment, each sheet of polymeric material is formed by an additive manufacturing method. For example, each sheet may be made by 3D printing, binder jetting, directed energy deposition, fused deposition modeling, laser sintering, material jetting, material extrusion, powder bed fusion, rapid prototyping, rapid tooling, sheet lamination, or vat photopolymerization. A jig or other fixture may be employed to aid in the assembly of multiple sheets to ensure proper orientation of each sheet. Alternatively, a jig or fixture may help define the shape of an individual sheet during the additive manufacturing process.

In an alternative embodiment, each sheet of polymeric material is formed by a subtractive manufacturing method. For example, the sheet of polymeric material may be cut (such as with a die, knife, or laser). Where a subtractive process is used, the sheet may be shaped before it is placed on top of the other sheets. Alternatively, the sheet may be only partially formed before it is placed on top of the other sheets, and then cut to its final shape after placement. Such a process would obviate the need for exactly placement of the sheet.

In another alternative embodiment, each sheet of polymeric material is formed by a molding process.

In one embodiment, each sheet of polymeric material 110 has a thickness of about 2 mm (~0.080 inches). In alternative embodiments, each sheet of polymeric material may have a thickness between 0.02 mm to 25.4 mm (0.001 inches to 1 inch). In one embodiment, each sheet of polymeric material in the tire has substantially the same thickness. In alternative embodiments, the thickness of the sheets may vary. For example, thicker or thinner sheets may be used at different locations to change the spacing or placement of a reinforcement. It should be understood that in an additive manufacturing process, the sheets may not be visibly distinct from each other and thus they may not have a discernible thickness.

With continued reference to FIG. 1, the non-pneumatic tire 100 further includes a plurality of reinforcements 150, with each reinforcement 150 being disposed between adjacent sheets of polymeric material 110. In the illustrated embodiment, the reinforcement 150 is a plurality of cords forming a pair of upper rings 160, a lower ring 170, and a plurality of spoke reinforcements 180. The cords may also be referred to as wires or filaments. The upper rings 160 of the reinforcement 150 are sandwiched between the upper rings 120 of adjacent sheets of polymeric material 110. Likewise, the lower ring 170 of the reinforcement 150 is sandwiched between the lower rings 130 of adjacent sheets of polymeric material 110. Additionally, the spoke reinforcements 180 are sandwiched between the spoke portions 140 of adjacent sheets of polymeric material 110.

The pair of upper rings 160 of the reinforcement 150 are positioned such that when the tire 100 is cured, the upper rings 160 of the reinforcement 150 form a shear element defined by the upper pair of rings 120 of the sheets of polymeric material 110. In other words, a portion of the upper rings 120 of the polymeric material 110 is an elastic material disposed radially between the substantially inelastic membranes formed by the pair of upper rings 160 of the reinforcement 150.

However, it should be understood that the shape of the reinforcement 150 shown in FIG. 1 is merely exemplary. In alternative embodiments, some or all of the upper rings 160 of the reinforcement 150 may be omitted. Likewise, some or all of the lower rings 170 of the reinforcement 150 may be omitted. Additionally, some or all of the spoke reinforcements 180 may be omitted. In other alternative embodiments, multiple reinforcements may be employed on some portions. While the reinforcements are continuous components in the illustrated embodiment, it should be understood that the reinforcements may be discontinuous. For example, the reinforcements may be chopped fibers that are distributed along portions of a polymeric sheet.

The reinforcement 150 may be constructed of a material selected from the group consisting of steel, polyester, nylon, carbon fiber, aramid, fiber glass, cotton, hemp, polyurethane and other plastic, other synthetic or natural fibers, and other metal materials. While the reinforcement 150 is shown as a plurality of cords in FIG. 1, in alternative embodiments, the reinforcement is a mesh of material or a sheet of material. In another alternative embodiment, the reinforcement may be chopped fibers.

To construct the non-pneumatic tire 100, the method includes forming a first sheet of polymeric material 110 having a substantially circular shape. The first sheet of polymeric material 110 may be formed using any of the methods described above. The first sheet of polymeric material 110 may be formed on a flat surface, or it may be formed on a jig or fixture.

The method then includes placing a reinforcement 150 on the first sheet of polymeric material 110. In one embodiment, the reinforcement 150 has a preformed shape before it is placed on the first sheet of polymeric material 110. In an alternative embodiment, the reinforcement 150 may be shaped as it is being placed on the first sheet of polymeric material 110. For example, the reinforcement may be extruded or 3D printed onto the first sheet of polymeric material 110.

The method further includes placing a second sheet of polymeric material having a substantially circular shape on the first sheet of polymeric material, such that the reinforcement 150 is sandwiched between the first sheet of polymeric material and the second sheet of polymeric material. The method is then repeated, so that additional reinforcements and additional sheets of polymeric material are placed on top of each other until a tire is built having a predetermined width. In other words, the tire is built in a direction perpendicular to the axis of rotation of the tire, and the number of layers and their width determines the width of the tire. In one embodiment, the tire has a width of 190 mm (7.5 inches). In other embodiments, the tire has a width of 12.5 mm to 1525 mm (0.5 inches to 60 inches). A tire having a plurality of layers in the axial direction may be referred to as a composite layer tire.

In one embodiment, adhesive or cement may be applied to a sheet of polymeric material before or after the reinforcement is placed on it. Additionally, additives or chemical treatment may be selectively applied to the polymeric sheets or to the reinforcements during the build process. Further, some sheets of polymeric material may have a contoured surface or a roughened surface to promote adhesion. For example, a sheet of polymeric material may go through a roughening process after it is placed on the tire.

While FIG. 1 shows alternating layers of polymeric sheets and reinforcements, it should be understood that several layers of polymeric sheets may be placed together or several layers of reinforcements may be placed together. It should also be understood that the reinforcements may vary on different layers. For example, a lower ring reinforcement may be placed on a first sheet, a pair of upper ring reinforcements may be placed on a second sheet, and spoke reinforcements may be placed on a third sheet.

After the tire 110 is built, it is then cured. In one embodiment, the tire is cured in a vulcanization mold. When the tire is cured in a vulcanization mold, the outer surfaces of the tire may be further shaped during vulcanization. In an alternative embodiment, the tire is cured in an autoclave. An autoclave may cure the tire at lower pressures than a typical vulcanization mold, thereby allowing the tire to maintain its shape. In yet another embodiment, the tire may be cured between metal plates of other materials. In still another embodiment, the curing step may be omitted.

Many variations of composite layer tires are possible. For example, the type of material used as reinforcement may be selected to optimize the weight, stiffness, and other characteristics of the tire. Likewise, the amount and location of the reinforcement may also be selected to optimize characteristics of the tire. Examples of various composite layer tires are shown in FIGS. 2-16 and described below. It should be understood that these examples are not meant to be limiting and that further modifications may be made to enhance selected characteristics of the tire.

Figure 2:
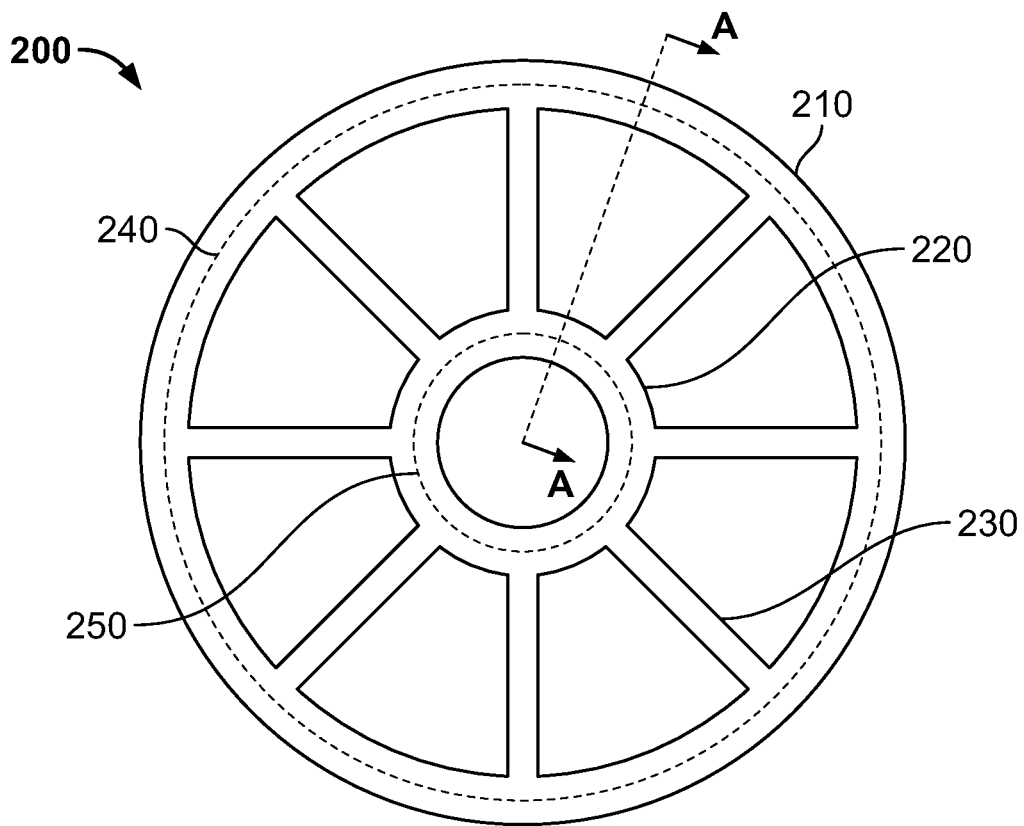
FIG. 2 illustrates a side view of an alternative embodiment of a non-pneumatic tire 200.
Figure 2A:
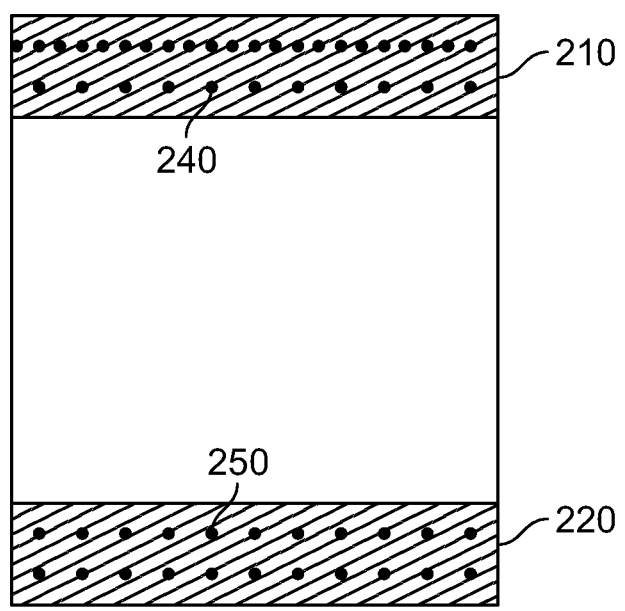
FIG. 2A illustrates a partial circumferential cross-sectional view of the non-pneumatic tire 200.

FIG. 2 illustrates a side view of an alternative embodiment of a non-pneumatic tire 200. Additionally, FIG. 2A illustrates a partial circumferential cross-sectional view of the non-pneumatic tire 200 taken along line A-A. The tire 200 includes an outer ring 210, an inner ring 220, and a plurality of spokes 230 extending between the outer ring 210 and inner ring 220. In this embodiment, first reinforcements 240 are located in the outer ring and second reinforcements 250 are located in the inner ring. The spokes 230 do not include reinforcements.

As can be seen in the cross-sectional view of FIG. 2A, the first reinforcements 240 include a pair of upper and lower reinforcements that may act as a shear element. Likewise, the second reinforcements 250 include a pair of upper and lower reinforcements that may act as a shear element. In other words, when an inner or outer ring bends, one of the reinforcements is placed in compression and the other reinforcement is placed in tension. Such an arrangement provides additional stiffness in the rings in both tension and compression. In alternative embodiments, one or both of the upper and lower rings includes a single reinforcement layer. In another alternative embodiment, some of the spokes may include reinforcements.

Figure 3:
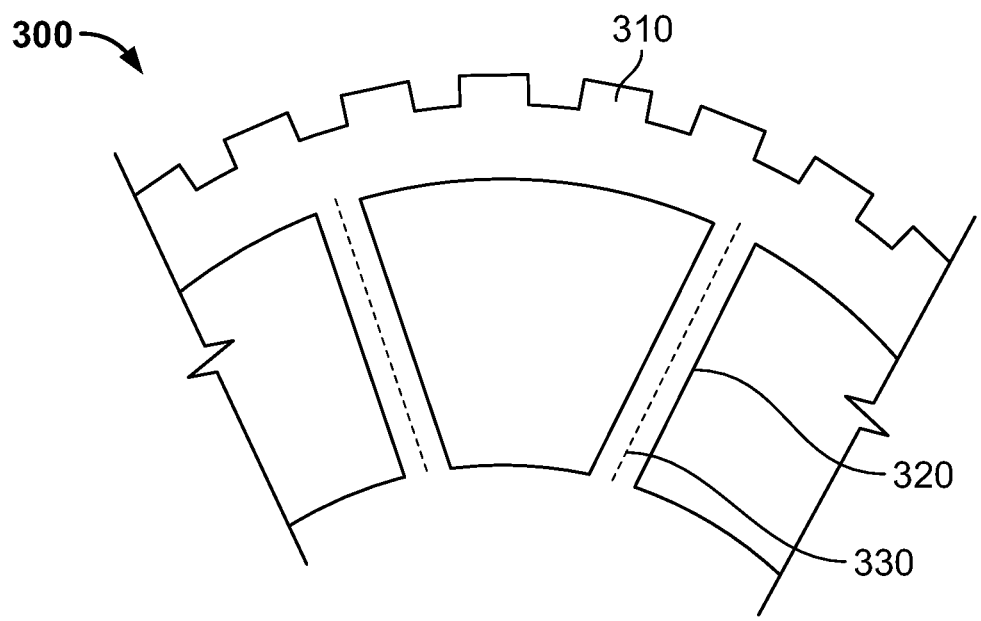
FIG. 3 illustrates a partial side cross-sectional view of one embodiment of a non-pneumatic tire.

FIG. 3 illustrates a partial side cross-sectional view of one embodiment of a partially assembled, composite layer, non-pneumatic tire 300. The tire 300 includes a tread portion 310 and a plurality of spokes 320. Each spoke 320 includes a reinforcement 330 extending in a radial direction. In the illustrated embodiment, a single reinforcement cord 330 is placed on each spoke portion of a sheet of polymeric material. During the building process, cords may be placed in the same location on each layer, such that the cords define a reinforcement plane extending in an axial direction for each spoke. Alternatively, the cords may be placed in different locations on different layers to form a non-planar reinforcement or to form reinforcements extending axially in a selected pattern.

The single cord reinforcement 330 in each spoke 320 provides additional stiffness in tension. This may be advantageous in non-pneumatic tires that are designed to carry some or all of a load in tension.

Figure 4:
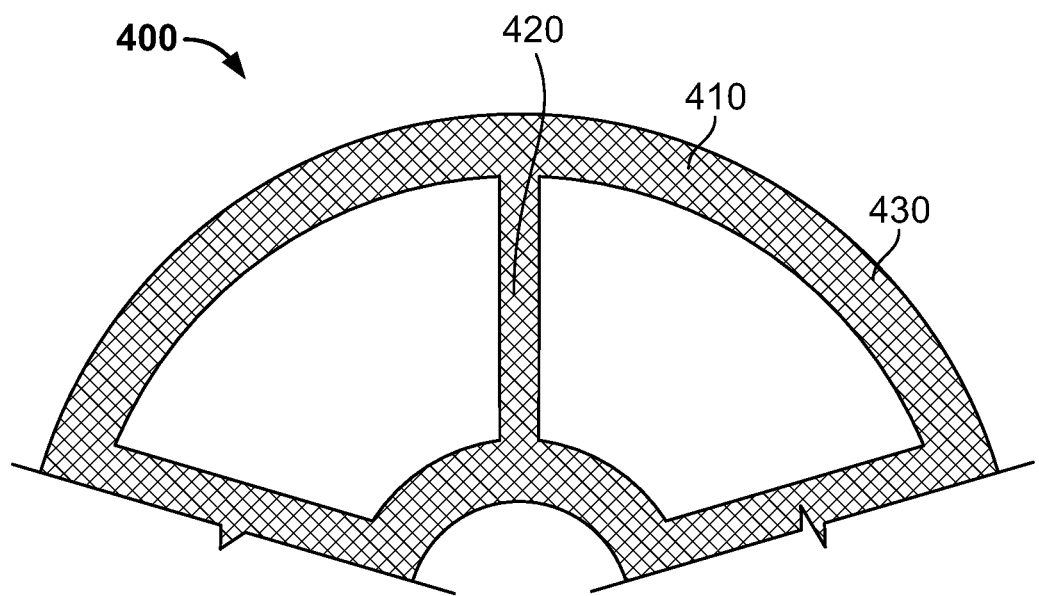
FIG. 4 illustrates a partial side cross-sectional view of an alternative embodiment of a non-pneumatic tire.

FIG. 4 illustrates a partial side cross-sectional view of an alternative embodiment of a non-pneumatic tire 400. The tire includes a tread portion 410 and a plurality of spokes 420. A reinforcement mesh 430 is disposed between sheets of polymeric material. In the illustrated embodiment, the reinforcement mesh 430 extends over the entire sheet of polymeric material. In alternative embodiments (not shown), the mesh may extend only over selected portions of the polymeric sheet.

The reinforcement mesh 430 provides additional stiffness in both tension and compression. This may be advantageous in non-pneumatic tires that are designed to carry some or all of a load in tension, as well as in non-pneumatic tires that are designed to carry some or all of a load in compression.

Figure 5A:
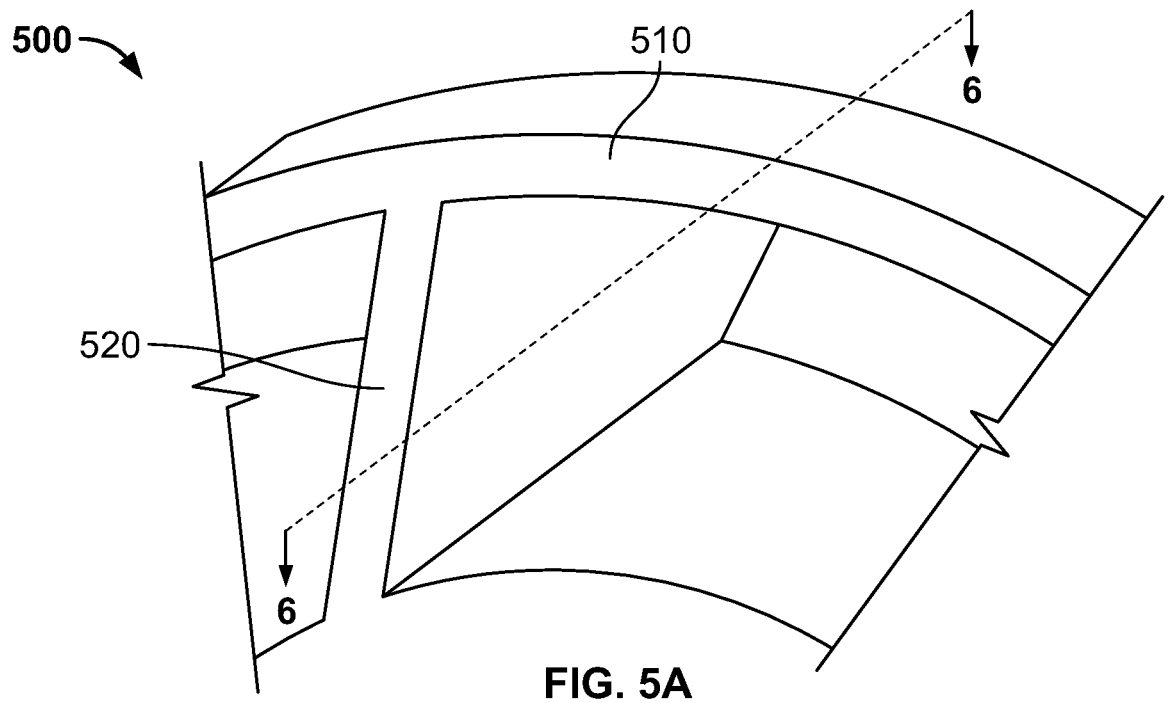
FIG. 5A illustrates a partial perspective view of one embodiment of a non-pneumatic tire 500.

FIG. 5A illustrates a partial perspective view of an alternative embodiment of a non-pneumatic tire 500. The tire 500 includes a tread portion 510 and a plurality of spokes 520.

Figure 5B:
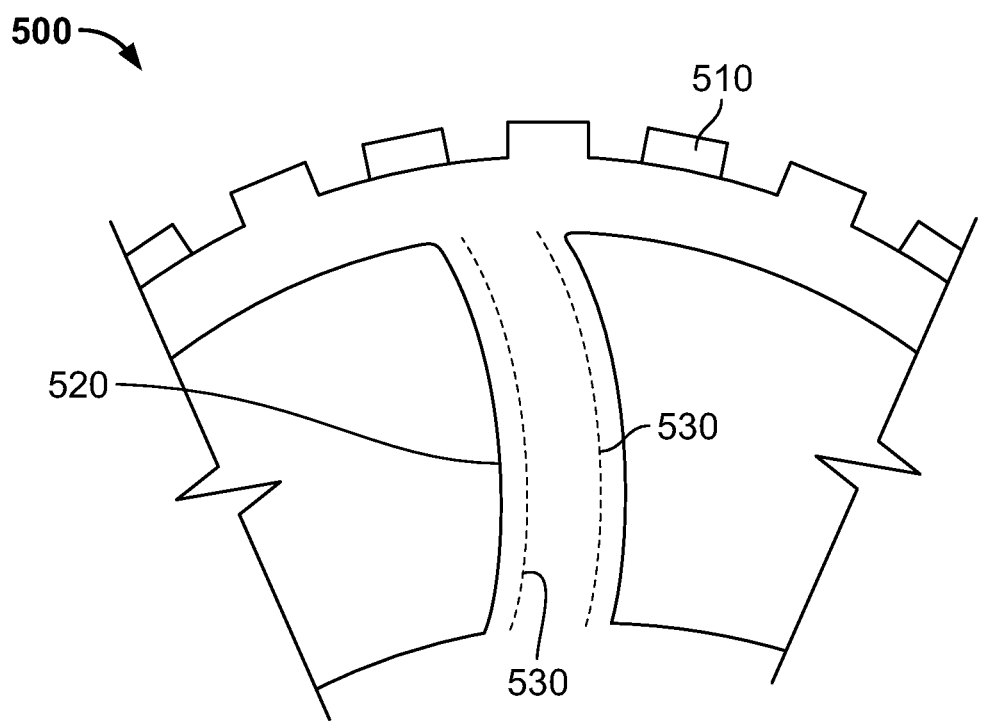
FIG. 5B illustrates a partial side cross-sectional view of the tire 500.

FIG. 5B illustrates a partial side cross-sectional view of the non-pneumatic tire 500. In the illustrated embodiment, the spokes 520 are shown as bending under compression, but are straight when no force is present. In an alternative embodiment, the spokes are curved when no force is present.

Each spoke 520 includes a pair of reinforcements 530 extending in a substantially radial direction. In the illustrated embodiment, a pair of reinforcement cords 530 is placed on each spoke portion of a sheet of polymeric material. Cords may be placed in the same location for each layer, such that the cords define a pair of reinforcement planes extending in an axial direction for each spoke. Alternatively, the cords may be placed in different locations on different layers to form a non-planar reinforcement or to form reinforcements extending axially in a selected pattern. Examples of several such embodiments are shown in FIGS. 6A-6D, each of which shows a radial cross-section of a spoke 520, looking downwards towards the center of the tire in a radial direction.

Figure 6A:
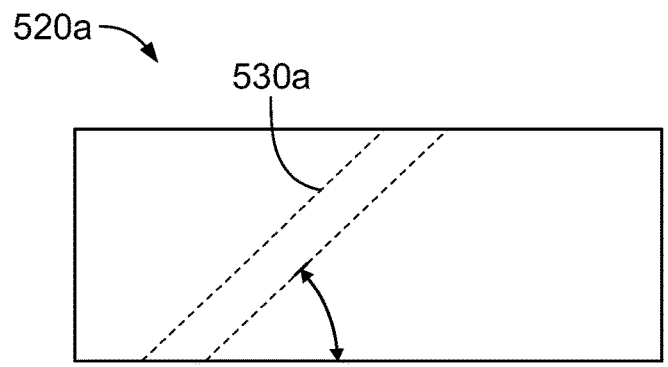
FIGS. 6A-6D illustrate radial cross-sectional views of spokes of alternative embodiments of the tire 500.

FIG. 6A illustrates a radial cross-sectional view of one embodiment of a spoke 520a. In the illustrated embodiment, a pair of reinforcements 530a is disposed on each sheet of polymeric material. After placing a new sheet of polymeric material during the tire build, the next pair of reinforcements 530a is placed at a location that is offset circumferentially from the previous pair of reinforcements 530a. The resulting reinforcements 530a are distributed in a diagonal direction across the width of the spoke 520a from one side of the tire to the other.

Figure 6B:
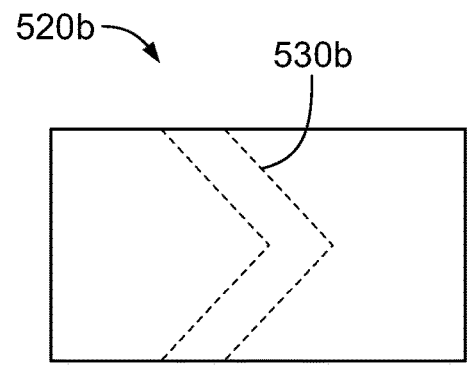

FIG. 6B illustrates a radial cross-sectional view of an alternative embodiment of a spoke 520b. In the illustrated embodiment, a pair of reinforcements 530b is disposed on each sheet of polymeric material. After placing a new sheet of polymeric material during the tire build, the next pair of reinforcements 530b is placed at a location that is offset circumferentially from the previous pair of reinforcements 530b. The reinforcements 530c are offset in a first direction on a first half of the tire, and then offset in an opposite direction on the second half of the tire. The resulting reinforcements 530b are distributed in a V-shape across the width of the spoke 520b from one side of the tire to the other.

Figure 6C:
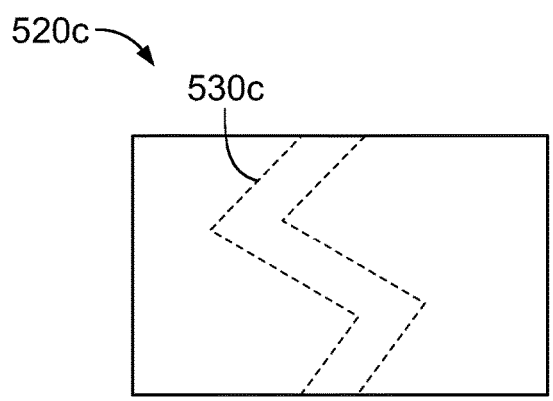

FIG. 6C illustrates a radial cross-sectional view of an alternative embodiment of a spoke 520c. In the illustrated embodiment, a pair of reinforcements 530c is disposed on each sheet of polymeric material. After placing a new sheet of polymeric material during the tire build, the next pair of reinforcements 530c is placed at a location that is offset circumferentially from the previous pair of reinforcements 530c. The reinforcements 530c are offset in a first direction for a first portion of the tire, then offset in an opposite direction for a second portion of the tire. The direction of the reinforcements 530c continues to alternate, resulting in a zig-zag distribution across the width of the spoke 520c from one side of the tire to the other.

Figure 6D:
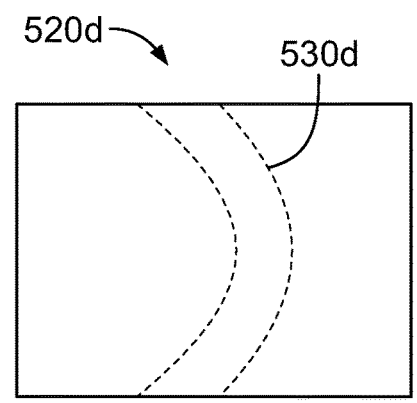

FIG. 6D illustrates a radial cross-sectional view of yet another alternative embodiment of a spoke 520d. In the illustrated embodiment, a pair of reinforcements 530d is disposed on each sheet of polymeric material. After placing a new sheet of polymeric material during the tire build, the next pair of reinforcements 530d is placed at a location that is offset circumferentially from the previous pair of reinforcements 530d. The reinforcements 530d are offset in a first direction on a first half of the tire, and then offset in an opposite direction on the second half of the tire, with the offset gradually changing. The resulting reinforcements 530d are distributed in a curved formation across the width of the spoke 520d from one side of the tire to the other.

In each of the embodiments shown in FIGS. 6A-6D, equal spacing is maintained between the pair of reinforcements 530 on each layer. In alternative embodiments (not shown), the spacing may change on different layers.

In each of the embodiments shown and described in FIGS. 5-6, the pair of reinforcements 530 in each spoke 520 acts as a shear beam. In other words, when the spoke 530 bends, one of the reinforcements is placed in compression and the other reinforcement is placed in tension. Such an arrangement provides additional stiffness in the spokes in both tension and compression. This may be advantageous in non-pneumatic tires that are designed to carry some or all of a load in tension, as well as in non-pneumatic tires that are designed to carry some or all of a load in compression. However, it should be understood that in alternative embodiments a single reinforcement layer may be arranged in the orientations shown in FIGS. 6A-6D.

Figure 7:
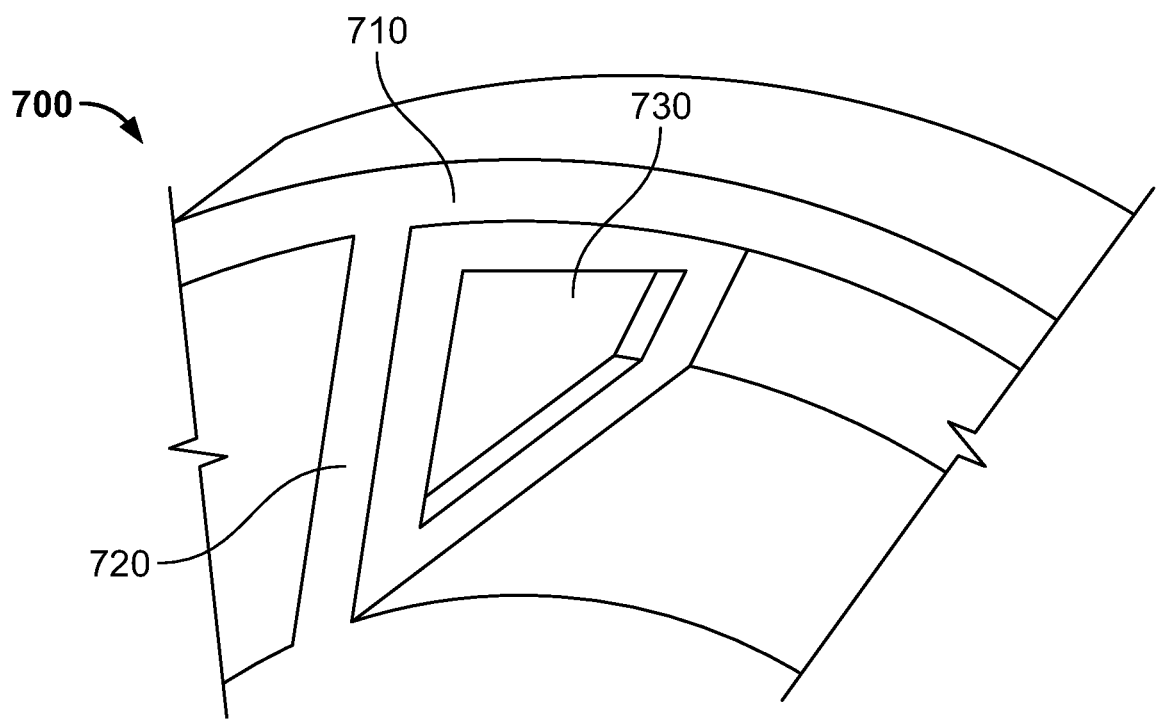
FIG. 7 illustrates a partial perspective view of an alternative embodiment of a non-pneumatic tire.

FIG. 7 illustrates a partial perspective view of another alternative embodiment of a non-pneumatic tire 700. The tire 700 includes a tread portion 710 and a plurality of spokes 720. In this embodiment, the spokes 720 are not solid, but instead have an opening 730. In the illustrated embodiment, the opening 730 is substantially rectangular. In alternative embodiments (not shown), the openings may be triangular, pentagonal, hexagonal, octagonal, circular, oval, or have any geometric shape.

When a tire is cured at high temperatures and pressures, the green rubber may flow during the curing process. However, if the tire is cured at lower temperatures or lower pressures, the openings 730 may maintain their shape during the curing process. For example, the tire may be cured in an autoclave at a lower pressure than would be provided during a curing process in a tire vulcanization mold. In one embodiment, the tire is cured at a temperature between 38° C. to 260° C. (100° F. to 500° F.) and at a pressure between 0.10 mPa to 0.70 mPa (15 PSI to 100 PSI). However, it should be understood that the tire may be cured at other temperatures and pressures.

Figure 8:
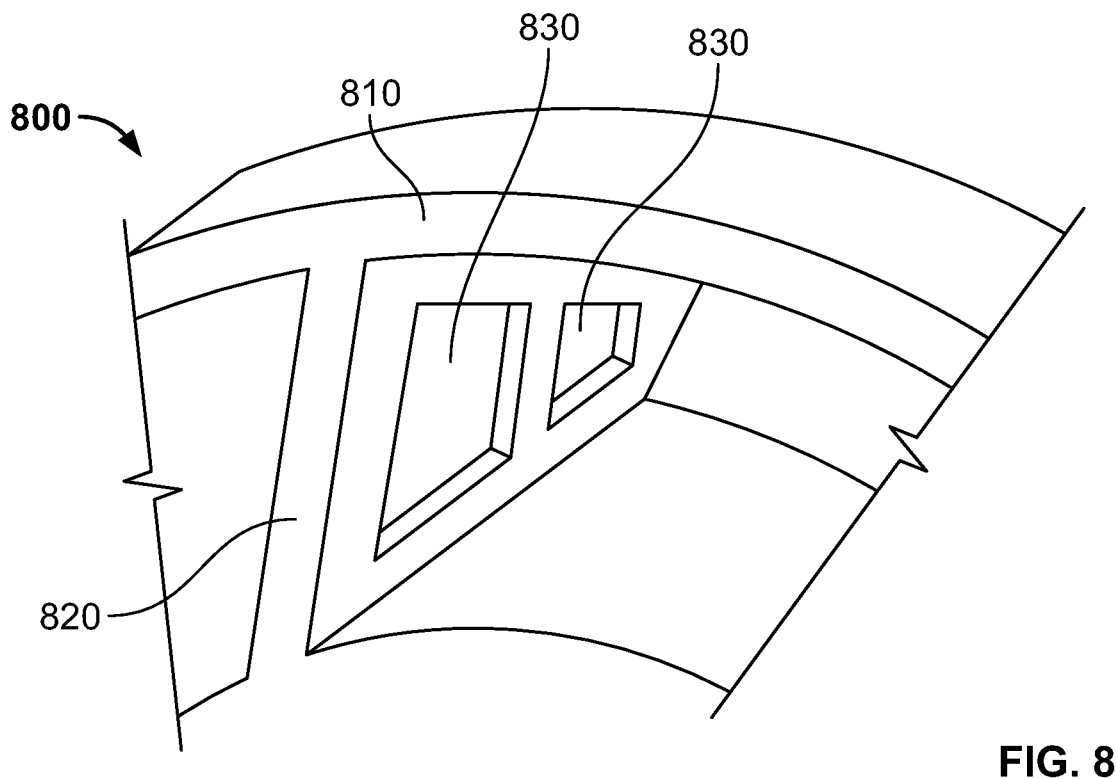
FIG. 8 illustrates a partial perspective view of another alternative embodiment of a non-pneumatic tire.

FIG. 8 illustrates a partial perspective view of another alternative embodiment of a composite layer, non-pneumatic tire 800. The tire 800 includes a tread portion 810 and a plurality of spokes 820. In this embodiment, the spokes 820 are not solid, but instead have a pair of opening 830. In the illustrated embodiment, the openings 830 are substantially rectangular. In alternative embodiments (not shown), the openings may be triangular, pentagonal, hexagonal, octagonal, circular, oval, or have any geometric shape. While two openings are shown on each spoke, it should be understood that any number of openings may be employed.

In the embodiments shown in FIGS. 7 and 8, the openings in the spokes may reduce the weight of the tire. The openings also allow air to flow around the tire in a manner different from tires having solid spokes. The size and location of the openings may be selected to control the air flow in a desired manner to reduce noise, cool the tires, enhance performance, or for other reasons. In other embodiments, the size and location of the openings may be selected to control the air flow in a desired manner to increase noise. For example, in a spare tire or other low-use tire, an increased noise may discourage a person from using the tire for an extended period of time. As another example, the size and location of the openings in the spokes may be selected to produce more noise when the tires are used at excessive speeds.

Figure 9A:
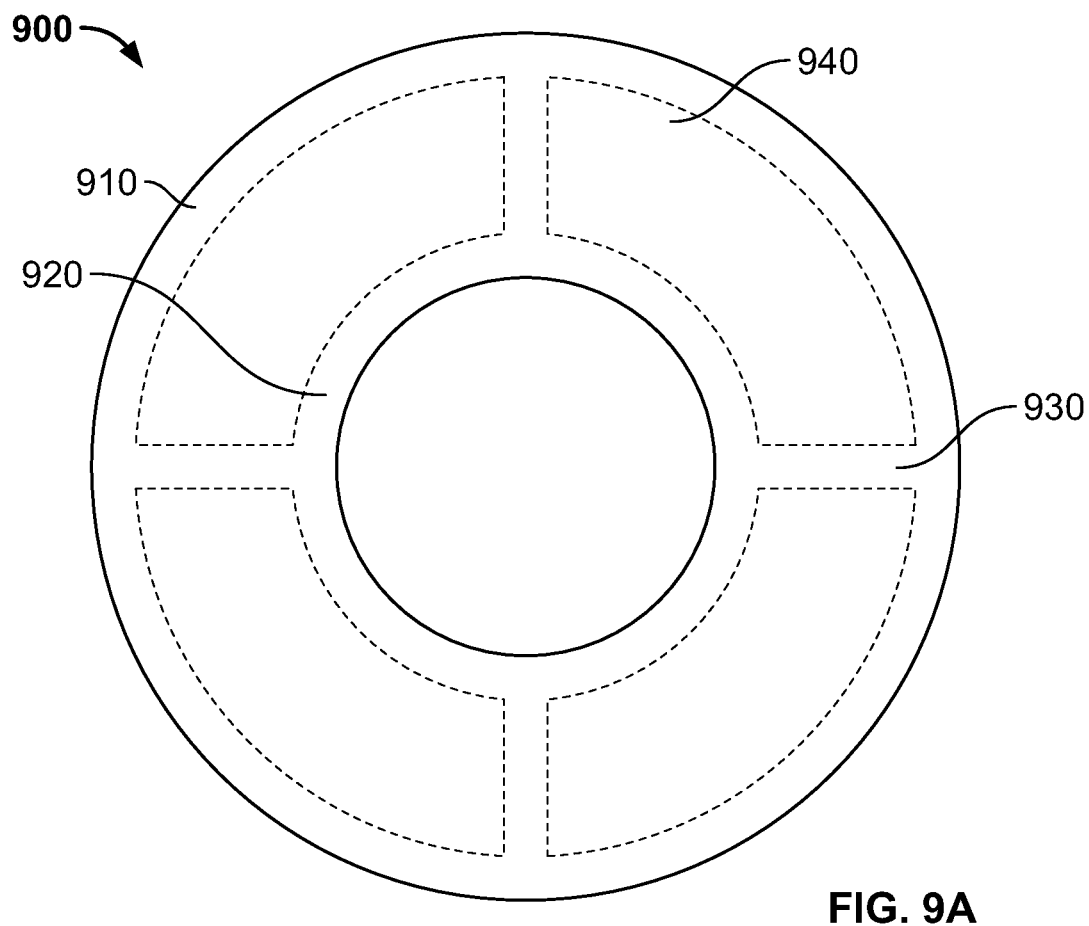
FIG. 9A illustrates a side view of yet another alternative embodiment of a non-pneumatic tire 900.
Figure 9B:
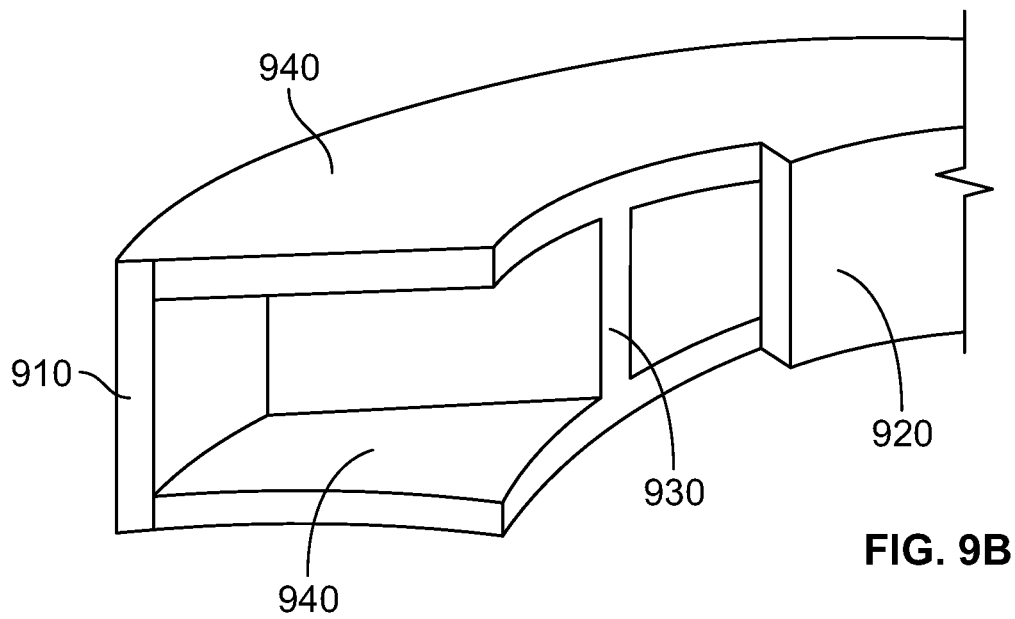
FIG. 9B illustrates a partial cutaway perspective view of the non-pneumatic tire 900.

FIG. 9A illustrates a side view of yet another alternative embodiment of a non-pneumatic tire 900. Additionally, FIG. 9B illustrates a partial cutaway perspective view of the non-pneumatic tire 900. The tire 900 includes an upper ring 910, a lower ring 920, and a plurality of spokes 930 extending between the upper ring 910 and the lower ring 920. In the illustrated embodiment, the tire 900 further includes sidewalls 940 (or covers) on the outer ends. The sidewalls 940 may be constructed of the same material as the other components of the tire 900. Alternatively, the sidewalls may be constructed of a different material. In one embodiment, the sidewalls 940 are constructed of a transparent material. The sidewalls may protect the spokes 930 and other elements of the tire 900 from damage by debris and may also keep the tire components clean from dust and dirt. Such solid layers could also be used at other axial locations on the tire to control the stiffness of the tire.

While reinforcements are not expressly shown in the tire 900 in FIGS. 9A and 9B, it should be understood that reinforcements may be employed in the manner described above. For example, any of the upper ring 910, lower ring 920, and spokes 930 may include one or more reinforcements.

Figure 10A:
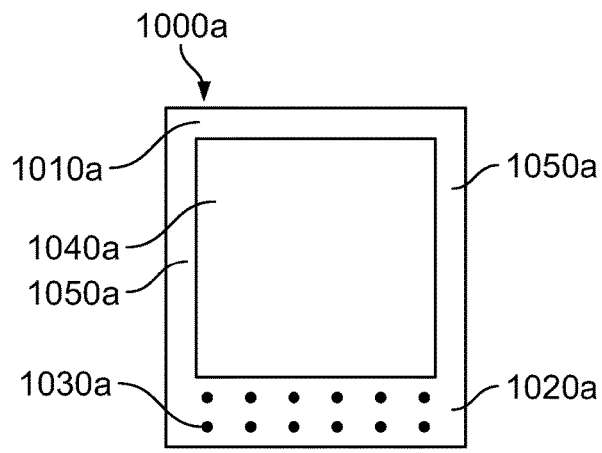
FIGS. 10A-10B illustrate circumferential cross-sectional views of spokes of other alternative embodiments of tires.
Figure 10B:
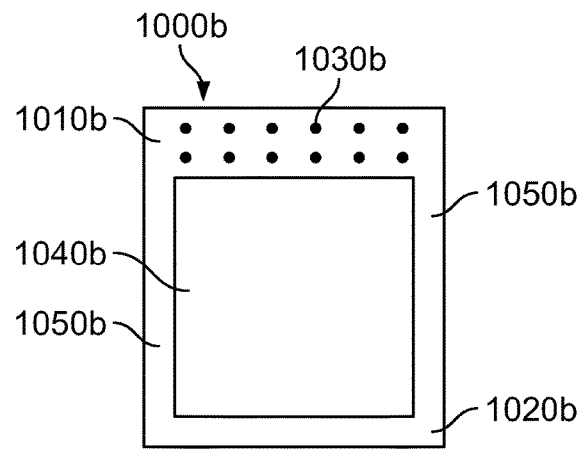

FIGS. 10A-10B illustrate partial cross-sections in the circumferential direction of exemplary embodiments of tires 1000a, 1000b. In FIG. 10A, the tire 1000a includes an upper ring 1010a and a lower ring 1020a. In this embodiment, the lower ring 1020a includes a plurality of reinforcements 1030a and the remainder of the tire does not include reinforcements. An empty space 1040a is disposed between outside members 1050a. The outside members 1050a may be outer sidewalls or covers on the tire 1000a, such as the sidewalls 940 shown in FIGS. 9A and 9B. Alternatively, the outside members 1050a may be part of a spoke having a window, such as the spoke 720 shown in FIG. 7.

In FIG. 10B, the tire 1000b includes an upper ring 1010b and a lower ring 1020b. In this embodiment, the upper ring 1010b includes a plurality of reinforcements 1030b and the remainder of the tire does not include reinforcements. An empty space 1040b is disposed between outside members 1050b. The outside members 1050b may be outer sidewalls or covers on the tire 1000b, such as the sidewalls 940 shown in FIGS. 9A and 9B. Alternatively, the outside members 1050b may be part of a spoke having a window, such as the spoke 720 shown in FIG. 7.

Figure 11A:
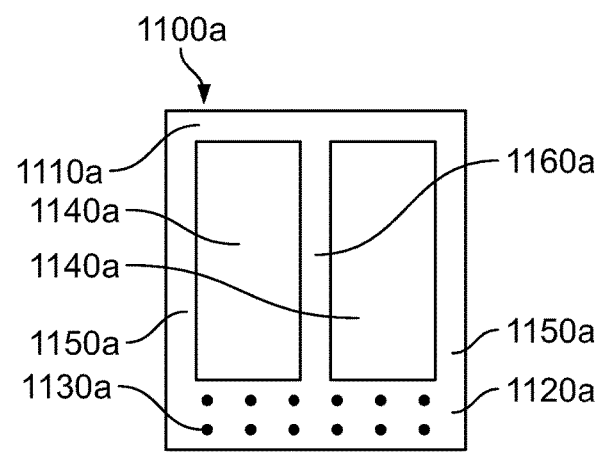
FIGS. 11A-11B illustrate circumferential cross-sectional views of spokes of still other alternative embodiments of tires.
Figure 11B:
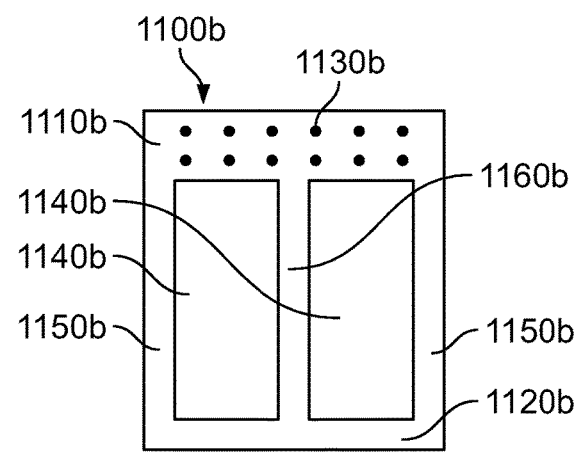

FIGS. 11A-11B illustrate partial cross-sections in the circumferential direction of exemplary embodiments of tires 1100a, 1100b. In FIG. 11A, the tire 1100a includes an upper ring 1110a and a lower ring 1120a. In this embodiment, the lower ring 1120a includes a plurality of reinforcements 1130a and the remainder of the tire does not include reinforcements. Empty spaces 1140a are disposed between outside members 1150a and a central member 1160a. The outside members 1150a may be outer sidewalls or covers on the tire 1100a (such as the sidewalls 940 shown in FIGS. 9A and 9B) and the central member 1160a may be a solid circular portion disposed about the equatorial plane of the tire. Alternatively, the outside members 1150a and central member 1160a may form a spoke having a pair of windows, such as the spoke 820 shown in FIG. 8.

In FIG. 11B, the tire 1100b includes an upper ring 1110b and a lower ring 1120b. In this embodiment, the upper ring 1110b includes a plurality of reinforcements 1130b and the remainder of the tire does not include reinforcements. Empty spaces 1140b are disposed between outside members 1150b and a central member 1160b. The outside members 1150b may be outer sidewalls or covers on the tire 1100b (such as the sidewalls 940 shown in FIGS. 9A and 9B) and the central member 1160b may be a solid circular portion disposed about the equatorial plane of the tire. Alternatively, the outside members 1150b and the central member 1160b may form a spoke having a pair of windows, such as the spoke 820 shown in FIG. 8.

Figure 12:
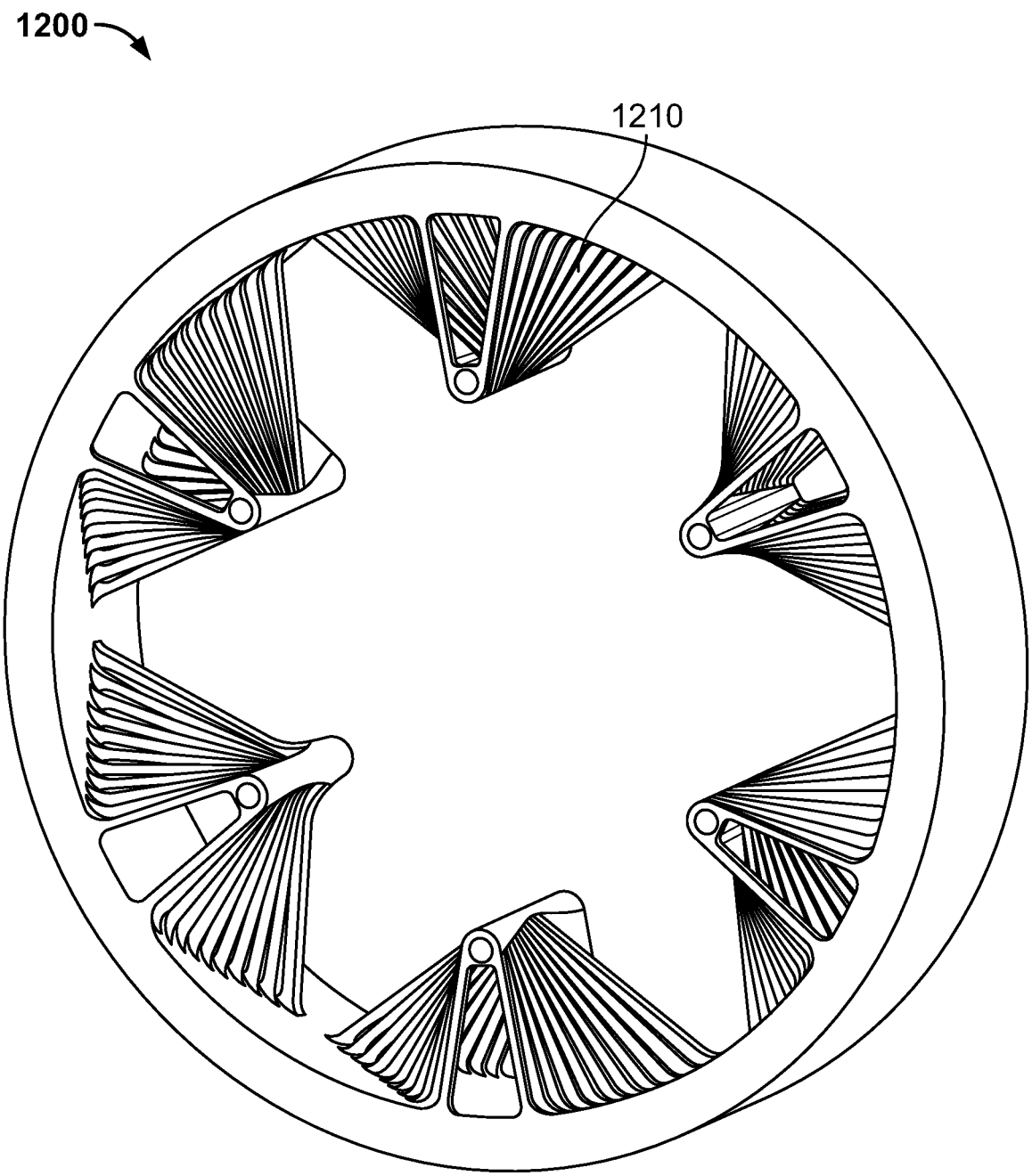
FIG. 12 illustrates a perspective view of still another alternative embodiment of a non-pneumatic tire 1200.
Figure 13:
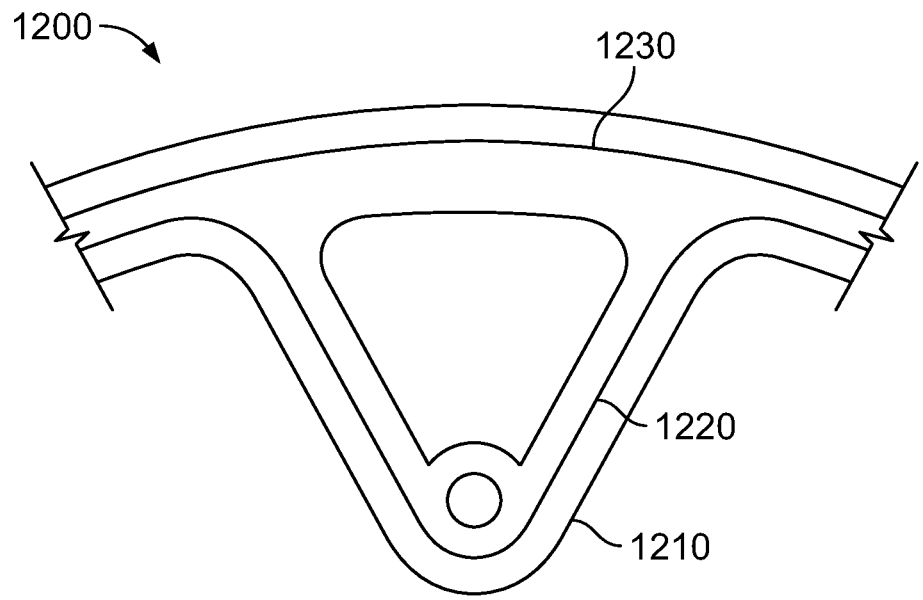
FIG. 13 illustrates a partial side cross-sectional view of the non-pneumatic tire 1200.

FIG. 12 illustrates a perspective view of still another alternative embodiment of non-pneumatic tire 1200. The tire 1200 is an example of a tire having changing cross-sections. The tire includes spokes 1210 that extend at varying angles at different axial locations along the tire. FIG. 13 shows a partial cross-section of the tire 1200. In this embodiment, the tire 1200 includes reinforcements 1220 that extend along the outer diameter of the tire and separate reinforcements 1230 that extend along the spokes 1210. In alternative embodiments, the reinforcements may be varied as desired. For example, any of the reinforcement configurations shown in FIGS. 1-11 may be employed.

It should be understood that the tire 1200 is merely exemplary, and that the method of making a composite layer tire may be employed to vary the thickness and shape of spokes or webbing at different axial locations on the tire.

Figure 14A:
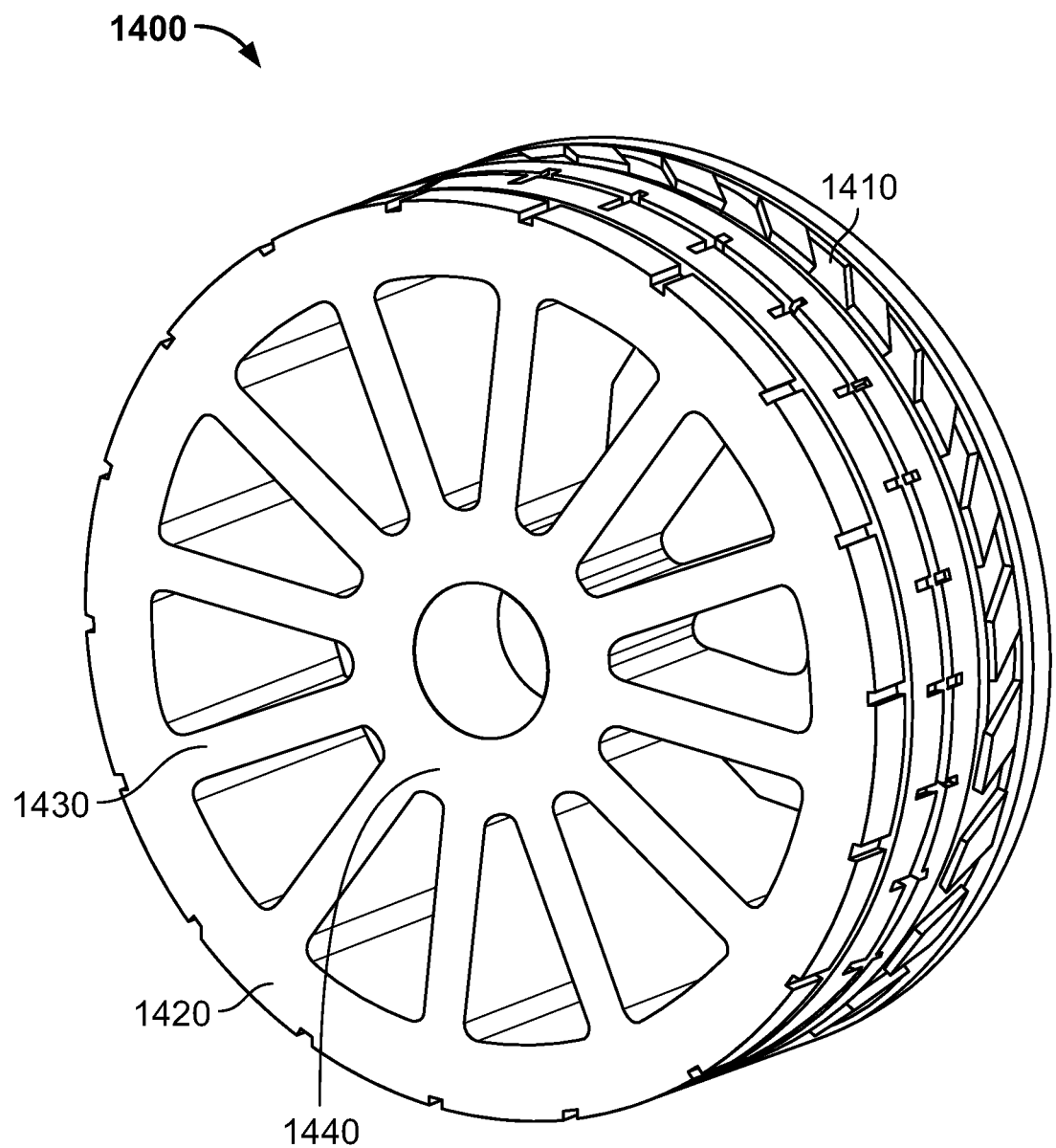
FIGS. 14A-14B illustrate first and second perspective views of yet another embodiment of a non-pneumatic tire.
Figure 14B:
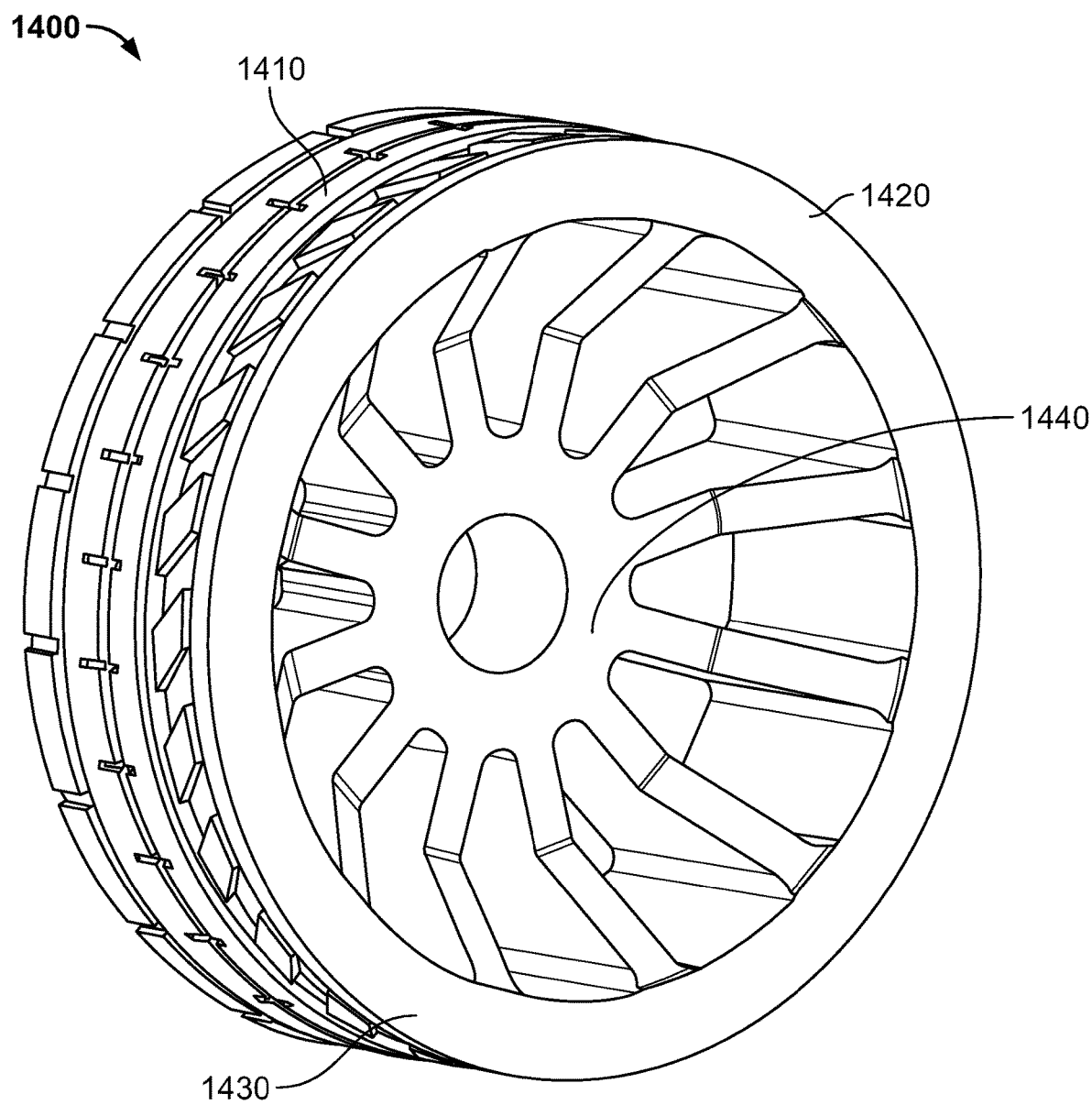

FIGS. 14A-14B illustrate first and second perspective views of yet another embodiment of a non-pneumatic tire 1400. The tire 1400 includes a tread 1410 disposed on an outer ring 1420. The tire 1400 further includes a plurality of spokes 1430 extending from the outer ring 1420 to an inner ring 1440. On the first side of the tire, shown in FIG. 14A, the tread 1410, outer ring 1420, spokes 1430, and inner ring 1440 each extend to the outer boundary of the first side. On the second side of the tire, shown in FIG. 14B, only the tread 1410 and outer ring 1420 extend to the outer boundary of the second side. The inner ring 1440 and lower portions of the spokes 1430 terminate at a first location, while upper portions of the spokes 1430 extend at an angle towards the outer boundary of the second side.

To produce the tire 1400 using a composite layer process, certain sheets of material (i.e., those sheets proximate to the first side of the tire) would include an outer ring portion, spoke portions, and an inner ring portion. Certain sheets closer to the second side of the tire would include outer ring portions and partial spoke portions, but no inner ring portion. Certain sheets proximate to the second side of the tire would include an outer ring portion, but no spoke portions or inner ring portion.

While FIGS. 14A and 14B do not show reinforcements in the tire 1400, it should be understood that reinforcements may be included in any region of the tire. Additionally, in an alternative embodiment, a reinforcement may be present in regions of the tire where green rubber (or other polymeric material) is absent. For example, one or more spoke portions may be absent from sheets of polymeric material during the building of a tire, such that the spokes of the resulting tire consist of bare cords of reinforcement material.

Figure 15:
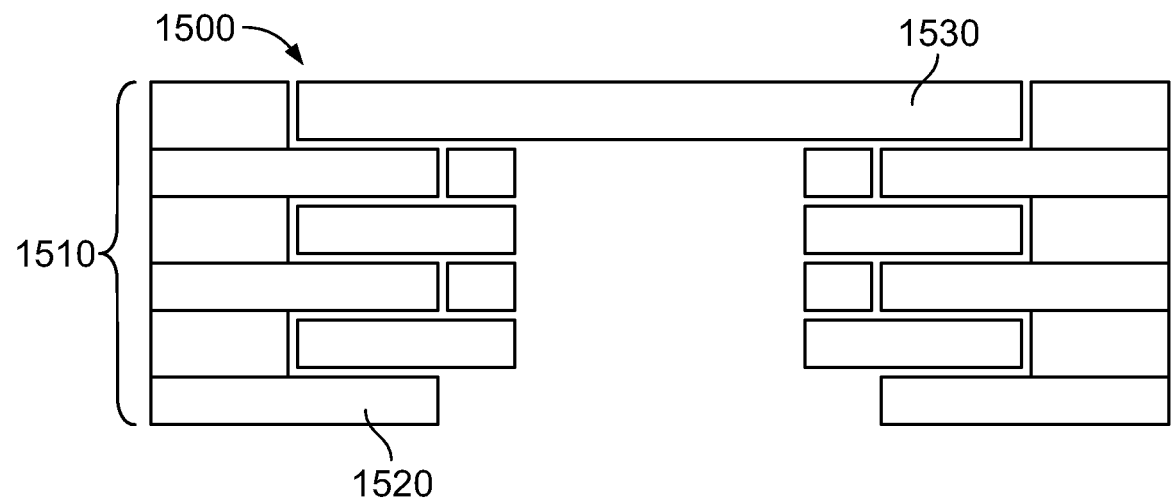
FIG. 15 illustrates a radial cross-sectional view of another alternative embodiment of a non-pneumatic tire.

FIG. 15 illustrates a radial cross-sectional view of another alternative embodiment of a non-pneumatic tire 1500. In this embodiment, the layers 1510 are constructed of different materials. For example, each layer 1510 may include a polymeric portion 1520 and a metal portion 1530. The metal portion 1530 may be employed for mounting the tire to a wheel, or to increase the stiffness of the tire. In an alternative embodiment, instead of a metal portion, the tire may be constructed of a combination of polymeric materials having low stiffness and polymeric materials having high stiffness.

Alternatively, metal materials could be fitted in between layers 1510 and cured into the tire to allow for mounting of tire. For example, metal plates with brass coating may be cured into the tire to provide integrated bolt holes for mounting. As another example, brass coated metal pins or bushings could be inserted during or after the layering process and cured in for mounting purposes.

Figure 16:
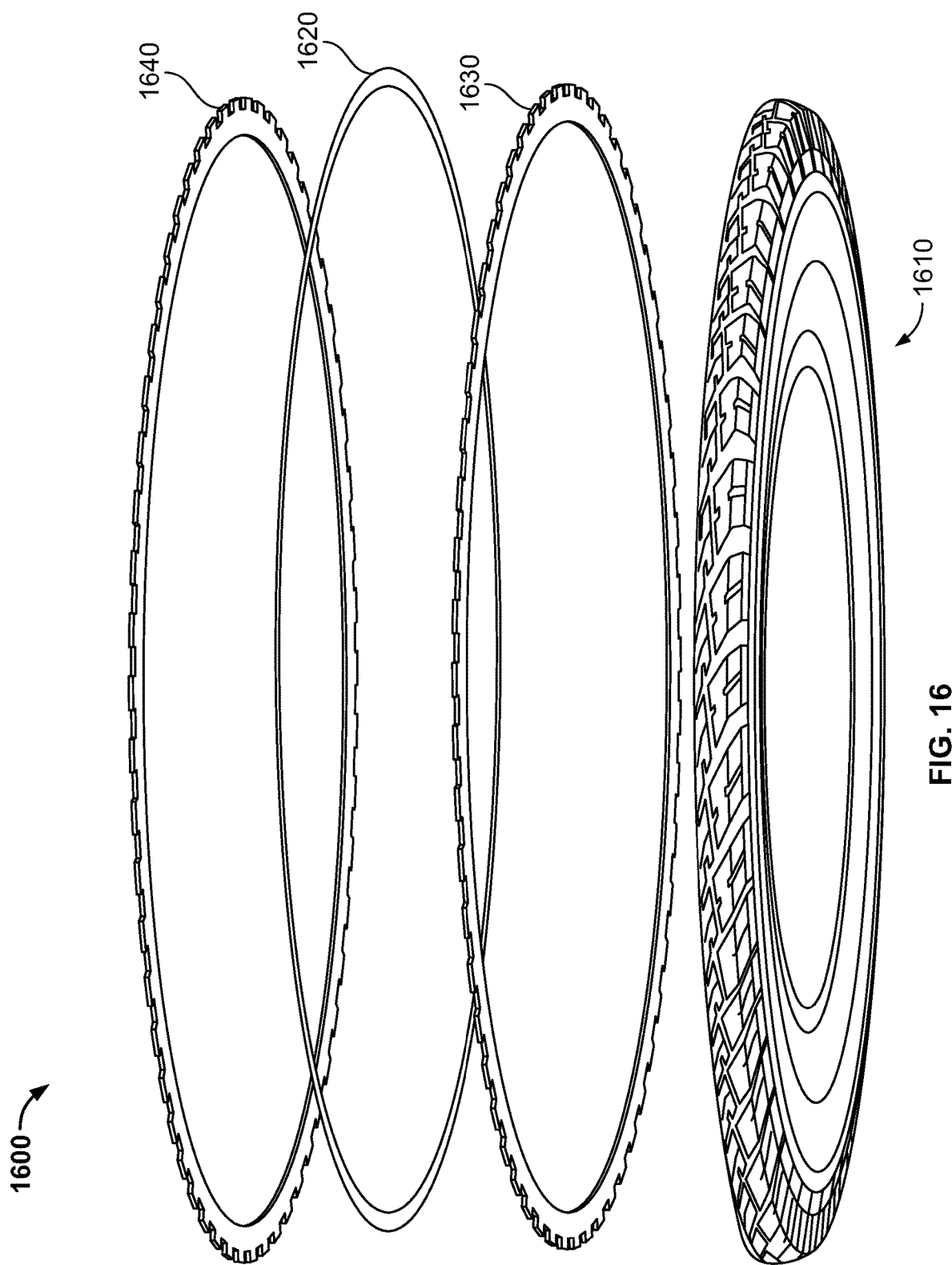
FIG. 16 illustrates an exploded view of one embodiment of a partially assembled pneumatic tire.

FIG. 16 illustrates an exploded view of one embodiment of a partially assembled pneumatic tire 1600. The pneumatic tire 1600 may be assembled using the same composite layer method described above. However, instead of spokes, the method is used to build bead portions (not shown), sidewalls 1610, and a tread 1620 of the tire. Additionally, the method may be used to build sidewall reinforcement layers (not shown), circumferential belts 1630, and a cap ply 1640. After the green tire is assembled it is cured in a vulcanization mold or an autoclave.

It should be understood that the pneumatic tire 1600 may be built with any number of alternative reinforcements or inserts to enhance performance under various conditions.

In both the pneumatic and non-pneumatic examples, electronics may be embedded into layers of the tire. For example, an RFID may be embedded in the tire. A conductive filament or material could be run through spokes or around other portions of the tire to allow for the detection of damage to the tire. For example, if a spoke is torn there would no longer be a conductive path and this could be sensed by the electronics in the tire. Conductive filaments may also be embedded in certain portions of the tire to aid in the discharge of static electricity that may build up as the tire rotates.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

What is claimed is:

1. A green tire comprising:
a plurality of sheets of green rubber having a substantially circular shape,
wherein each sheet of green rubber includes an upper ring and a lower ring, and
wherein each sheet of green rubber further includes a plurality of spoke portions extending from the upper ring to the lower ring; and
a plurality of reinforcements, each reinforcement being disposed between adjacent sheets of green rubber, the reinforcements being cords of material,
wherein at least one reinforcement is sandwiched between the upper rings of adjacent sheets of green rubber, and
wherein at least one reinforcement is sandwiched between the spoke portions of adjacent sheets of green rubber.

2. The green tire of claim 1, wherein each sheet of green rubber is constructed of a plurality of different green rubber compounds.

3. The green tire of claim 1, wherein at least one of the spoke portions has a geometry that varies along an axial direction of the green tire.

4. The green tire of claim 1, wherein each sheet of green rubber has between 10 and 40 spoke portions.

5. A green tire comprising:
a plurality of sheets of green rubber having a substantially circular shape,
wherein each sheet of green rubber includes an upper ring and a lower ring, and
wherein each sheet of green rubber further includes a plurality of spoke portions extending from the upper ring to the lower ring; and
a plurality of reinforcements, each reinforcement being disposed between adjacent sheets of green rubber, the reinforcements being cords of material,
wherein each reinforcement includes at least one upper ring and a plurality of spoke reinforcements extending from the at least one upper ring, the plurality of spoke reinforcements being spaced circumferentially from one another,
wherein at least one reinforcement is sandwiched between the upper rings of adjacent sheets of green rubber, and
wherein at least one reinforcement is sandwiched between the lower rings of adjacent sheets of green rubber.

6. The green tire of claim 5, wherein at least one of the plurality of sheets of green rubber includes a tire sidewall portion, and wherein the green tire is configured to be a pneumatic tire.

7. The green tire of claim 5, wherein the green tire is configured to be a non-pneumatic tire.

8. The green tire of claim 1, wherein each reinforcement includes at least one upper ring and at least one lower ring spaced apart from and below the at least one upper ring.

* * * * *